(12) United States Patent
Iwabuchi et al.

(10) Patent No.: US 12,255,702 B2
(45) Date of Patent: Mar. 18, 2025

(54) RELAY SYSTEM, RELAY CONTROL DEVICE, RELAY METHOD, AND RELAY CONTROL PROGRAM

(71) Applicant: NIPPON TELEGRAPH AND TELEPHONE CORPORATION, Tokyo (JP)

(72) Inventors: Masashi Iwabuchi, Musashino (JP); Tomoaki Ogawa, Musashino (JP); Tomoki Murakami, Musashino (JP); Riku Omiya, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 66 days.

(21) Appl. No.: 18/017,487

(22) PCT Filed: Jul. 28, 2020

(86) PCT No.: PCT/JP2020/028936
§ 371 (c)(1),
(2) Date: Jan. 23, 2023

(87) PCT Pub. No.: WO2022/024230
PCT Pub. Date: Feb. 3, 2022

(65) Prior Publication Data
US 2023/0275622 A1  Aug. 31, 2023

(51) Int. Cl.
*H04B 7/04* (2017.01)
*H04B 7/15* (2006.01)

(52) U.S. Cl.
CPC ........... *H04B 7/04013* (2023.05); *H04B 7/15* (2013.01)

(58) Field of Classification Search
CPC .............................. H04B 7/04013; H04B 7/15
See application file for complete search history.

(56) References Cited

U.S. PATENT DOCUMENTS

2019/0331764 A1  10/2019  Abari et al.
2021/0288698 A1*  9/2021  Chen .................... H04B 7/0617
(Continued)

OTHER PUBLICATIONS

C. Liaskos, A. Tsioliaridou, A. Pitsillides, S. Ioannidis, and I. Akyildiz, "Using Any Surface to Realize a New Paradigm for Wireless Communications", Communications of the ACM, Nov. 2018., vol. 61, No. 11, pp. 30-33.
(Continued)

*Primary Examiner* — Jaison Joseph
(74) *Attorney, Agent, or Firm* — Harness, Dickey & Pierce, P.L.C.

(57) ABSTRACT

A relay system includes: one or more radiation units configured to form a beam in a predetermined direction by radiating radio waves from each of a plurality of elements; a detection unit configured to detect a physical environment on a radio wave propagation path that affects the beam formed by the radiation unit; a direction determination unit configured to determine a direction in which the radiation unit should form the beam based on the physical environment detected by the detection unit; a phase calculation unit configured to calculate a phase of radio wave to be radiated by each of the plurality of elements such that the radiation unit forms a beam in the direction determined by the direction determination unit; and a phase control unit configured to control the phase of the radio wave radiated by each of the plurality of elements based on the phase calculated.

10 Claims, 8 Drawing Sheets

(56) References Cited

U.S. PATENT DOCUMENTS

| | | | | |
|---|---|---|---|---|
| 2022/0216909 A1* | 7/2022 | Bengtsson | | H04B 7/145 |
| 2022/0393930 A1* | 12/2022 | Nasiri Khormuji | | H04L 27/3411 |
| 2023/0040183 A1* | 2/2023 | Xu | | H04B 7/04013 |
| 2023/0136962 A1* | 5/2023 | Jiang | | H04B 7/04013 370/329 |
| 2023/0146485 A1* | 5/2023 | Jian | | H04B 7/15507 455/11.1 |
| 2023/0176174 A1* | 6/2023 | Penna | | G01S 5/02521 342/451 |
| 2023/0275622 A1* | 8/2023 | Iwabuchi | | H04B 7/15 375/262 |
| 2023/0292277 A1* | 9/2023 | Dou | | H04W 16/28 |

OTHER PUBLICATIONS

E. Basar, M. D. Renzo, J. D. Rosny, M. Debbah, M-SAlouini, and R. Zhang, "Wireless Communications Through Reconfigurable Intelligent Surfaces", IEEE Access, Aug. 2019., vol. 7, pp. 116753-116773.

Q. Wu, and R. Zhang, "Intelligent Reflecting Surface Enhanced Wireless Network via Joint Active and Passive Beamforming", IEEE transaction on wireless communications, Nov. 2019., vol. 18, No. 11, pp. 5394-5409.

\* cited by examiner

RELAY SYSTEM, RELAY CONTROL DEVICE, RELAY METHOD, AND RELAY CONTROL PROGRAM

CROSS-REFERENCE TO RELATED APPLICATIONS

This application is a 371 U.S. National Phase of International Application No. PCT/JP2020/028936, filed on Jul. 28, 2020. The entire disclosure of the above application is incorporated herein by reference.

TECHNICAL FIELD

The present invention relates to a relay system, a relay control device, a relay method, and a relay control program.

BACKGROUND ART

To realize high speed and large capacity wireless access, using a high frequency band that can ensure a broad bandwidth is drawing attention. For example, the 5G mobile communication system uses a 28 GHz band, and the wireless LAN standard IEEE802.11ad (millimeter wave wireless LAN system) uses a 60 GHz band to implement a high speed and large capacity.

In a high frequency band, radio waves are easily attenuated compared to a low frequency band, and have radio wave properties of being less likely to be diffracted. Therefore, in a case where a high frequency band is used, challenges that should be addressed include short transmission distances and significant deterioration of the reception quality due to shielding.

In order to compensate for the radio wave attenuation, beamforming that uses a multielement antenna in a transmitter station and a receiver station is advantageous. In other words, it is possible to compensate the radio wave attenuation based on a beamforming gain and increase the transmission distance.

In the beamforming, radio waves from a specific direction are strongly transmitted and received in both the transmitter station and the receiver station, and thus the radio wave from one high-power propagation path is mainly received by the receiver station. Consequently, the beamforming causes the number of times of spatial multiplexing to be kept as 1 (or 2 in the case of polarized multiplexing), and thus it is difficult to achieve the space diversity effect by receiving the same signal.

On the other hand, multiple antennas may be installed to ameliorate the deterioration of the reception quality caused by shielding or non-line-of-sight. For example, it is possible to reduce the range of shielding or non-line-of-sight by installing many transmission antennas at suitable intervals. By installing many transmission antennas, it is possible to address the challenges in the beamforming as stated above.

However, installing many transmission antennas causes problems that the network cost increases and a larger installation space is required. For providing many transmission points, using, for example, reflectors that are less expensive and have less installation restrictions without the need for a larger installation space can be considered.

Conventionally, it is difficult to dynamically control the reflection characteristics. However, since a reflector (dynamic reflector) that can dynamically control the reflection characteristics using a metasurface or array element configuration has been successfully developed, it is thus possible to implement a method for achieving spatial multiplexing and a spatial diversity gain while using the dynamic reflector to reduce shielding or non-line-of-sight (for example, see NPLs 1 to 3).

Examples of a method of controlling the dynamic reflector includes a method of changing characteristics of radio wave by controlling a phase of the radio waves when the dynamic reflector reflects the radio wave. For example, there is a method of changing a phase of the radio waves reflected by a dynamic reflector composed of array elements based on channel state information (CSI) between transmitter and receiver stations (for example, see NPL 3).

CITATION LIST

Non Patent Literature

[NPL 1] C. Liaskos, A. Tsioliaridou, A. Pitsillides, S. Ioannidis, and I. Akyildiz, "Using Any Surface to Realize a New Paradigm for Wireless Communications", Communications of the ACM, November 2018, Vol. 61, No. 11, pp. 30-33

[NPL 2] E. Basar, M. D. Renzo, J. D. Rosny, M. Debbah, M-SAlouini, and R. Zhang, "Wireless Communications Through Reconfigurable Intelligent Surfaces", IEEE Access, August 2019, Vol. 7, pp. 116753-116773

[NPL 3] Q. Wu, and R. Zhang, "Intelligent Reflecting Surface Enhanced Wireless Network via Joint Active and Passive Beamforming", IEEE Transaction on Wireless Communication, November 2019, vol. 18, No. 11, pp. 5394-5409

SUMMARY OF INVENTION

Technical Problem

However, in the conventional system based on the channel state information between the transmitter and receiver stations, the characteristics of the receiver station can be optimized, but the channel state information for each array element through which radio waves pass is required. For example, in a case where the dynamic reflector is composed of 100 array elements, it is necessary to calculate a phase change amount based on 100 pieces of channel state information.

In other words, a large overhead occurs because the channel state information is acquired. In addition, since it can be assumed that a certain calculation resource is necessary to calculate the phase change amount for each array element, it is assumed that the phase change amount is calculated on the base station side. In this case, quality improvement by the dynamic reflector cannot be achieved unless the base station has a new function.

It is also assumed that the base station and the dynamic reflector may be installed at a remote place. Therefore, in the conventional method, a communication unit is required to reflect the phase change amount calculated by the base station in the dynamic reflector. The dynamic reflector also needs a function for cooperation with the base station.

In a case where the dynamic reflector reflects radio waves, if there are vehicles or pedestrians which block the radio waves on the radio wave propagation path, the dynamic reflector may not be able to relay the radio waves efficiently.

The present invention is made to solve the problems stated above, and is intended to provide a relay system, a relay control device, a relay method and a relay control program, each of which is capable of relaying radio waves efficiently even if a physical environment on a radio wave propagation path changes.

Solution to Problem

A relay system according to a first aspect of the present invention is a relay system for relaying radio waves between one or more wireless terminals and a base station, the relay system including: one or more radiation units configured to form a beam in a predetermined direction by radiating radio waves from each of a plurality of elements; one or more detection units configured to detect a physical environment on a radio wave propagation path that affects the beam formed by the radiation unit; a direction determination unit configured to determine a direction in which the radiation unit should form the beam based on English Translation of the physical environment detected by the detection unit; a phase calculation unit configured to calculate a phase of radio waves to be radiated by each of the plurality of elements such that the radiation unit forms a beam in the direction determined by the direction determination unit; and a phase control unit configured to control the phase of the radio waves radiated by each of the plurality of elements based on the phase calculated by the phase calculation unit.

A relay control device according to a second aspect of the present invention is a relay control device for controlling one or more relay devices, in which each of the relay devices includes a radiation unit configured to form a beam in a predetermined direction by radiating radio waves from each of a plurality of elements in accordance with a preset phase, while relaying radio waves between one or more wireless terminals and a base station, the relay control device including: a direction determination unit configured to determine a direction in which the radiation unit should form the beam based on a physical environment detected by one or more detection devices, in which each of the detection devices is configured to detect the physical environment on a radio wave propagation path that affects the beam formed by the radiation unit; a phase calculation unit configured to calculate a phase of radio waves to be radiated by each of the plurality of elements such that the radiation unit forms a beam in the direction determined by the direction determination unit; and a transmission unit configured to transmit information indicating the phase calculated by the phase calculation unit to the relay device.

A relay method according to a third aspect of the present invention is a relay method for relaying radio waves between one or more wireless terminals and a base station, the method including: a detection step of detecting a physical environment on a radio wave propagation path that affects a beam formed by one or more radiation units that form a beam in a predetermined direction by radiating radio waves from each of the plurality of elements; a direction determination step of determining a direction in which the radiation unit should form the beam based on the physical environment detected; a phase calculation step of calculating a phase of radio waves to be radiated by each of the plurality of elements such that the radiation unit forms a beam in the direction determined; and a phase control step of controlling the phase of the radio waves radiated by each of the plurality of elements based on the calculated phase.

Advantageous Effects of Invention

According to the present invention, radio waves can be efficiently relayed even if the physical environment on the radio wave propagation path changes.

DESCRIPTION OF EMBODIMENTS

Figure 8:
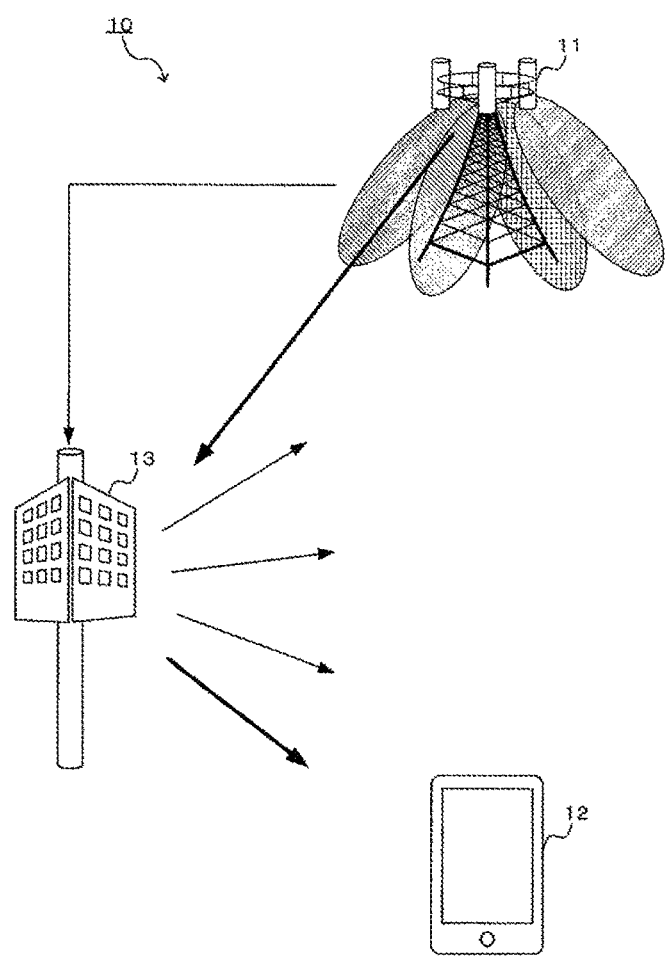
FIG. 8 is a diagram illustrating an exemplified configuration of a wireless communication system having a dynamic reflector according to a comparative example.

For the description of the relay system according to one embodiment, the background of the present invention will be described first. FIG. 8 is a diagram illustrating an exemplified configuration of a wireless communication system 10 having a dynamic reflector according to a comparative example.

In the wireless communication system 10, a dynamic reflector 13 having a plurality of reflection elements reflects and relays radio waves to establish wireless communication between a base station 11 and a wireless terminal 12. At this time, the base station 11 acquires channel state information (CSI) for all of the plurality of reflection elements included in the dynamic reflector 13, and adjusts a phase of a radio wave reflected by the dynamic reflector 13.

Therefore, in addition to general functions that the base station includes, the base station 11 needs an advanced signal processing function for acquiring and processing channel state information for all of the plurality of reflection elements, and a function to notify the dynamic reflector 13 of information on a phase for changing reflection characteristics.

That is, in the base station 11, the overhead increases for acquiring channel information, and if the number of reflection elements is large, an enormous calculation amount is needed for dynamically controlling the phase of the radio wave reflected by the dynamic reflector 13.

Figure 1:
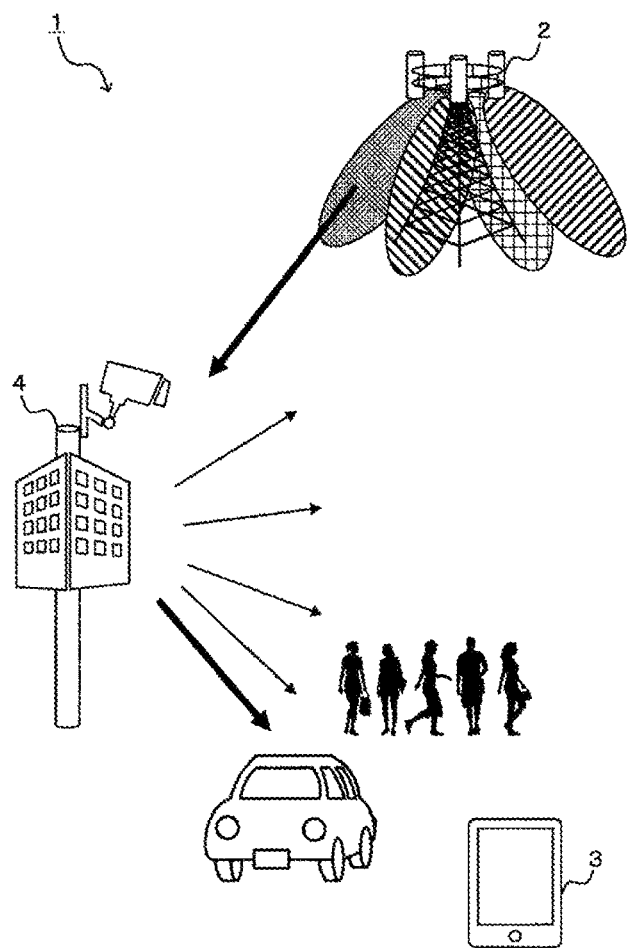
FIG. 1 is a diagram illustrating an exemplified configuration of a wireless communication system having a relay system according to one embodiment.

The wireless communication system having the relay system according to one embodiment will be described hereinbelow. FIG. 1 is a diagram illustrating an exemplified configuration of the wireless communication system 1 having the relay system according to one embodiment. As shown in FIG. 1, the wireless communication system 1 is configured such that, for example, wireless communication is established between one or more base stations 2 and one or more wireless terminals 3 via a relay system 4.

The relay system 4 relays a signal transmitted by the base station 2 to each wireless terminal 3 by controlling a radiation unit (e.g. dynamic reflector) having, for example, a plurality of elements (e.g. reflection elements), and relays a signal transmitted by each wireless terminal 3 to the base station 2. The wireless terminal 3 has a function of measuring (positioning) a position of its own station, and may transmit position information indicating such a position to the relay system 4.

The relay system 4 detects and analyzes a physical environment (including congestion level and environmental changes) that affects radio waves such as vehicle and pedestrians moving on the radio wave propagation path, calculates an index (described later) based on the analysis result, determines a direction in which the radiation unit should form the beam, and calculates a phase of radio waves to be radiated by each element to perform dynamic control.
English Translation of That is, the relay system 4 can dynamically control the radiation direction of the radio wave without using channel state information for all of the plurality of elements and without having an advanced signal processing function for processing the channel state information for all of the elements. Although the relay system 4 herein is exemplified with a case where the phase of the reflected radio wave is dynamically controlled, the relay system 4 may be constituted as a relay device which relays the radio wave by a repeater provided with a power amplifier and forming a beam when the received radio wave is re-radiated. Further, the relay system 4 may dynamically control the radiation direction (reflection direction or re-radiation direction) of the radio waves at an arbitrary timing.

Figure 2:
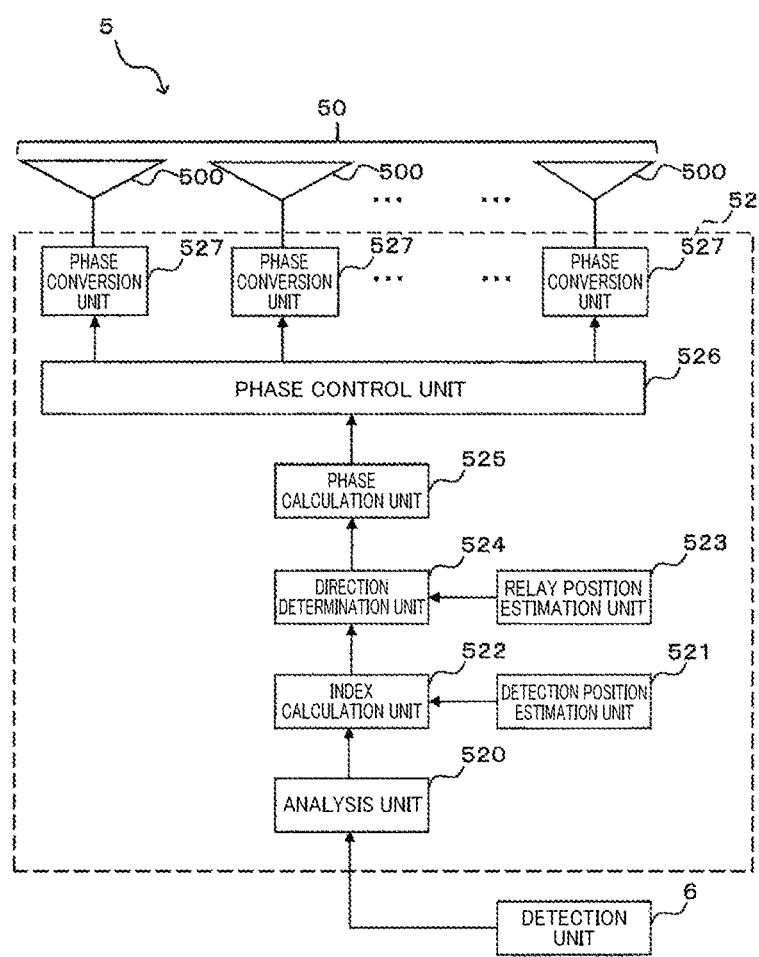
FIG. 2 is a functional block diagram illustrating functions that the relay system has.

A specific example of the relay system 4 will be described hereinbelow. FIG. 2 is a functional block diagram illustrating functions of the relay system 4. As shown in FIG. 2, the relay system 4 includes, for example, a relay unit 5 and a detection unit 6.

The relay unit 5 is a relay device which includes a radiation unit 50 for forming a beam, and a relay control unit 52 for controlling the radiation unit 50, and relays radio waves.

The detection unit 6 is a detection device that detects, for example, the physical environment (such as vehicles and pedestrians which block radio waves) on the radio wave propagation path that affects the beam formed by the radiation unit 50 as environmental information, and outputs the detection results to the relay control unit 52. For example, the detection unit 6 may be a camera that captures the surrounding environment, and detects image data as environment information.

The detection unit 6 may be a radio wave sensor which receives and uses radio wave as environment information indicating the surrounding environment. In this case, the detection unit 6 detects, for example, a receiving power, an arrival time, and channel state information of the received radio wave. A timing at which the detection unit 6 detects the environmental information and a timing at which the environmental information is output to the relay control unit 52 may be set arbitrarily in advance.

In particular, the radiation unit 50 is a dynamic reflector including a plurality of elements 500 in which, for example, the plurality of elements 500 are arranged in an array. The element 500 reflects the radio wave transmitted by the base station 2 and the radio wave transmitted by the wireless terminal 3 according to the control of the relay control unit 52. For example, the element 500 may be a so-called metamaterial, and has a characteristic of shifting the phase when the radio wave is reflected.

The element 500 may be a repeater which includes a power amplifier and re-radiates the received radio wave to form a beam. In other words, the radiation unit 50 forms a beam in a predetermined direction by radiating radio waves from each of the plurality of elements 500.

The relay control unit 52 includes an analysis unit 520, a detection position estimation unit 521, an index calculation unit 522, a relay position estimation unit 523, a direction determination unit 524, a phase calculation unit 525, a phase control unit 526, and a plurality of phase conversion units 527.

The analysis unit 520 analyzes the influence of the physical environment detected by the detection unit 6 on radio wave (for example, the beam formed by the radiation unit 50) and outputs the analysis result to the index calculation unit 522.

For example, the analysis unit 520 analyzes the environmental information detected by the detection unit 6, and estimates, for example, type, position, moving speed, moving direction, and appearance frequency in the periphery for an object that exists around.

In particular, the analysis unit 520 analyzes, in a case where the environmental information is image data taken by a camera, the image and determines the object (pedestrian, vehicle, etc.) included in the image. The analysis unit 520 also estimates the distance and position to the object determined from the image. Further, the analysis unit 520 estimates the moving speed and the moving direction of the object using a plurality of continuous images.

In a case where the environmental information is the information detected by a radio wave sensor, the analysis unit 520 estimates the type, position, moving speed, moving direction, and appearance frequency for the object based on, for example, a relationship between the environment and a behavior of the radio wave learned in advance.

The detection position estimation unit 521 estimates a position where the detection unit 6 detects the physical environment, and outputs to the index calculation unit 522 detection position information indicating the position where the detection unit 6 performs the detection. For example, the detection position estimation unit 521 has a sensor device (e.g. GPS, acceleration sensor, gyro sensor, magnetic force sensor, pressure sensor, etc.) and estimates the detection position information using the sensor device. Further, the detection position estimation unit 521 may periodically estimate the position of the detection unit 6 and update the detection position information.

Further, the detection position estimation unit 521 may estimate the position of the detection unit 6 when the detection unit 6 is installed, or alternatively, may use information (latitude, longitude, height, and relevant information) indicating the position of the detection unit 6 and manually input by the operator as the detection position information.

The index calculation unit 522 calculates an index that can be used by the direction determination unit 524 to determine the direction, using the detection position information output by the detection position estimation unit 521 and the analysis result output by the analysis unit 520, and outputs the calculated index to the direction determination unit 524.

For example, the index calculation unit 522 calculates the index that can be used by the direction determination unit 524 to determine the direction in which the radiation unit 50 reflects (or re-radiates) the beam, using the type, distance, position, moving speed and moving direction of the surrounding object, which are estimated by the analysis unit 520.

The index calculated by the index calculation unit 522 is, for example, the density of the object estimated by the analysis unit 520. For example, the index calculation unit 522 may estimate the number of objects existing in a predetermined area and calculate the density based on the position of the object, which has been estimated by the analysis unit 520.

Further, the index calculation unit 522 may use a time that the object stays in the predetermined area as the index, or alternatively, may calculate an average staying time of the object for each area and use the product of the appearance frequency of the object and the average staying time as the index. The index calculation unit 522 may calculate and list the index for each area, and output to the English Translation of direction determination unit 524 the listing result by giving priority to the area having the highest index value.

The relay position estimation unit 523 estimates a position where the relay unit 5 relays the radio wave, and outputs to the direction determination unit 524 relay position information indicating the position where the relay unit 5 relays the radio wave. For example, the relay position estimation unit 523 has a sensor device (GPS, acceleration sensor, gyro sensor, magnetic force sensor, pressure sensor, etc.) and estimates the relay position information using the sensor device. Further, the relay position estimation unit 523 may periodically estimate the position of the relay unit 5 and update the relay position information.

The relay position estimation unit 523 may estimate a position of the relay unit 5 when the relay unit 5 is installed, or alternatively, may use information (latitude, longitude, height, and relevant information) indicating the position of the relay unit 5 and manually input by the operator as the relay position information.

In a case where the relay unit 5 and the detection unit 6 are integrally configured, assuming that the relay position information and the detection position information have the same value, it is not necessary to provide either the relay position estimation unit 523 or the detection position estimation unit 521.

The direction determination unit 524 determines the direction (reflection or re-radiation direction) in which the radiation unit 50 should form a beam, based on the relay position information output by the relay position estimation unit 523 and the index (for example, a list) calculated by the index calculation unit 522, and outputs direction information indicating the determined direction to the phase calculation unit 525.

For example, in a case where the index calculated by the index calculation unit 522 is a density, the direction determination unit 524 determines a direction of an area having a high density as the direction of reflection or re-radiation. Further, the direction determination unit 524 may determine a direction toward the center of the area, or may determine a direction toward the center of gravity of the object position at a certain moment in the area.

In a case where the index calculated by the index calculation unit 522 is the product of the staying time or appearance frequency of the object and the average staying time, the direction determination unit 524 sets, for example, an area having the maximum value as the area having the highest priority, and determines the direction toward the area in the same manner.

The phase calculation unit 525 calculates the phase of the radio wave to be radiated by each of the plurality of elements 500, and outputs phase information indicating the calculated phase to the phase control unit 526, such that the radiation unit 50 forms a beam in the direction determined by the direction determination unit 524.

For example, the phase calculation unit 525 calculates a phase amount to be controlled by the phase control unit 526 using the direction determined by the direction determination unit 524 and the direction toward the base station 2. At this time, the phase calculation unit 525 may estimate the direction to the base station 2 using preset position information (latitude, longitude and height) of the base station 2 and the relay position information estimated by the relay position estimation unit 523.

In a case where the detection unit 6 is a camera and is taking photos of the surrounding environment, the phase calculation unit 525 may estimate a direction from the relay unit 5 to the base station 2 using the position information of the base station 2 estimated by the analysis unit 520 with the image data as the environmental information, as well as the detected position information and the relay position information as stated above.

In a case where the single radiation unit 50 radiates using radio waves transmitted from the plurality of wireless terminals 3, the phase calculation unit 525 may divide the plurality of elements 500 into a plurality of element groups, and calculate the phase of the radio waves radiated by each element 500 so as to radiate the radio waves toward the different wireless terminals 3 for each element group.

For example, in a case of reflecting (or re-radiating) radio waves to four high-priority areas at the same time, the relay unit 5 having N elements 500 may calculate the phase of the radio wave so as to radiate the radio wave in each direction of the area using N/4 elements 500 for each area. In this case, the relay unit 5 can improve the communication quality of the plurality of areas at the same time, although the gain after the radiation of the radio wave is reduced.

The phase control unit 526 controls the phase of the radio waves radiated by each of the plurality of elements 500 by controlling each of the plurality of phase conversion units 527 based on the phase information calculated by the phase calculation unit 525. The phase conversion unit 527 is provided individually, for example, for each element 500, and performs conversion that changes the phase of the radio waves radiated by the element 500 according to the control conducted by the phase control unit 526.

For example, the phase control unit 526 controls each of the plurality of phase conversion units 527 such that the phase of the radio wave reflected by each of the plurality of elements 500 is slightly shifted based on the phase calculated by the phase calculation unit 525. For example, in a case where the element 500 is the metamaterial stated above, the phase conversion unit 527 dynamically changes the phase shift amount allocated the element 500 by changing the characteristics of the element 500 according to the control of the phase control unit 526. In this way, the phase control unit 526 controls the radiation unit 50 to perform beamforming in a predetermined direction by changing the characteristics of the metamaterial, multiplying the phase change amount, or imparting a predetermined delay.

In a case where the controllable phase amount for the element 500 is discrete, the phase control unit 526 selects the phase amount closest to the phase (phase change amount) calculated by the phase calculation unit 525 from the configurable phase amounts, and controls each of the plurality of phase conversion units 527.

Figure 3:
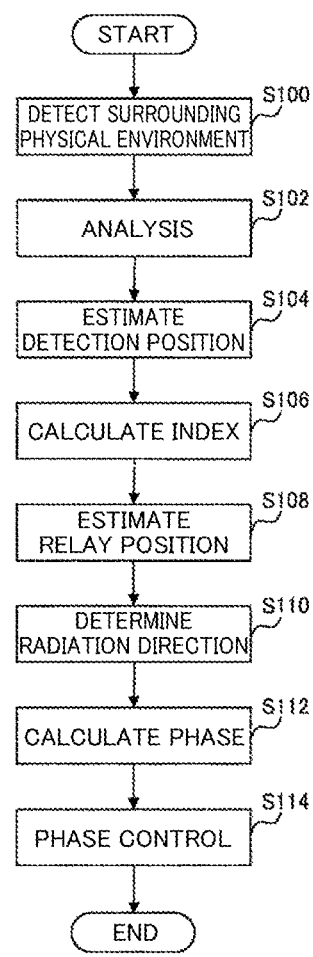
FIG. 3 is a flowchart illustrating an exemplified operation of the relay system.

An exemplified operation of the relay system 4 will be described hereinbelow. FIG. 3 is a flowchart illustrating the exemplified operation of the relay system 4. As shown in FIG. 3, in the relay system 4, the detection unit 6 first detects the surrounding physical environment as the environmental information (S100).

In the relay system 4, the analysis unit 520 analyzes the environmental information (S102), and the detection position estimation unit 521 estimates the detection position of the detection unit 6 (S104).

The index calculation unit 522 calculates the index that can be used by the direction determination unit 524 to determine the direction using the result analyzed by the analysis unit 520 and the detection English Translation of position estimated by the detection position estimation unit 521 (S106).

When the relay position estimation unit 523 estimates the relay position where the relay unit 5 relays the radio wave (S108), the direction determination unit 524 determines the radiation direction in which the radiation unit 50 emits the beam (S110) based on the relay position information estimated by the relay position estimation unit 523 and the index calculated by the index calculation unit 522.

The phase calculation unit 525 calculates the phase of the radio wave to be radiated by each of the plurality of elements 500 such that the radiation unit 50 radiates the beam in the direction determined by the direction determination unit 524 (S112).

The phase control unit 526 controls the phase of the radio waves radiated by each of the plurality of elements 500 by controlling each of the plurality of phase conversion units 527 based on the phase calculated by the phase calculation unit 525 (S114).

In the relay system 4, the phase calculation unit 525 calculates the phase of the radio wave to be radiated by each of the plurality of elements 500 based on the physical environment detected by the detection unit 6, and the phase control unit 526 controls the phase of the radio waves radiated by each of the plurality of elements 500. Therefore, even if the physical environment on the radio wave propagation path changes, radio waves can be relayed efficiently. Further, since the relay system 4 controls the phase of the radio waves radiated by each of the elements 500 when the radio wave arrives, it is possible to expand the coverage by the base station 2.

Figure 4:
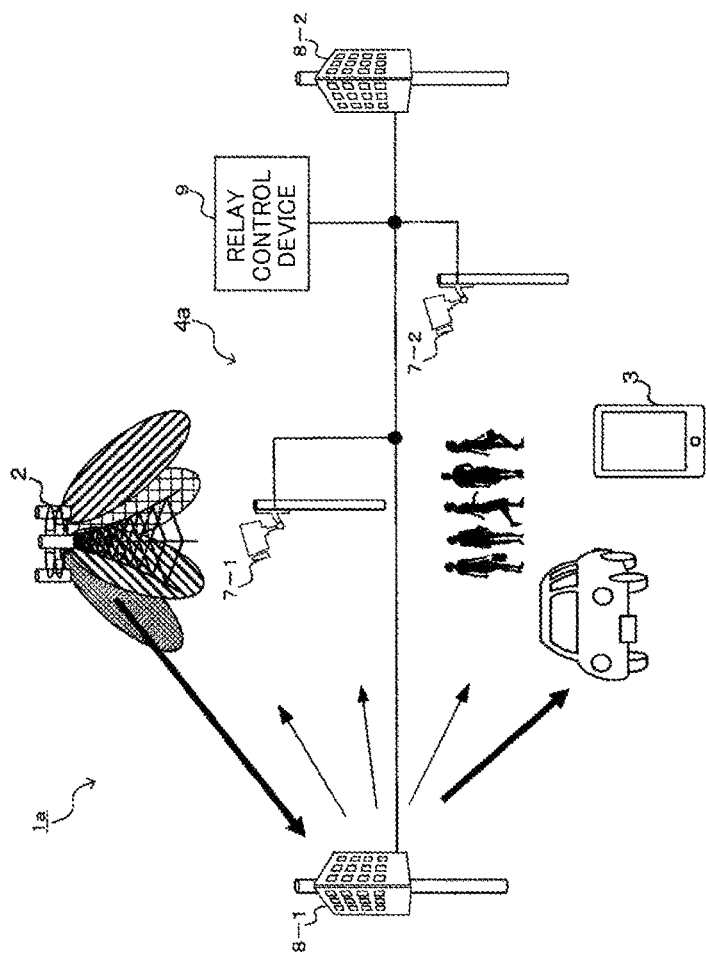
FIG. 4 is a diagram illustrating an exemplified configuration of a wireless communication system having a relay system according to another embodiment.

A wireless communication system including a relay system according to another embodiment will be described hereinbelow. FIG. 4 is a diagram illustrating an exemplified configuration of a wireless communication system 1a having a relay system according to another embodiment. As shown in FIG. 4, the wireless communication system 1a is configured such that, for example, wireless communication is established between the base station 2 and the wireless terminal 3 via a relay system 4a.

The relay system 4a has, for example, two detectors 7-1 and 7-2, two relay devices 8-1 and 8-2, and a relay control device 9. Hereinafter, in a case where one of a plurality of configurations such as the detection devices 7-1 and 7-2 is not specified, it is simply abbreviated as, for example, the detection device 7.

Similar to the detection unit 6 described above, the detection device 7 has a function of detecting the physical environment (such as vehicles and pedestrians which block radio waves) on the radio wave propagation path that affects radio waves as the environmental information, and a function of transmitting the detected environmental information to the relay control device 9. For example, the detection device 7 is, for example, a camera that captures the surrounding environment, detects image data as the environment information, and transmits the image data to the relay control device 9. Further, the detection device 7 may be a radio wave sensor that receives radio waves and uses them as the environmental information indicating the surrounding environment.

Figure 5:
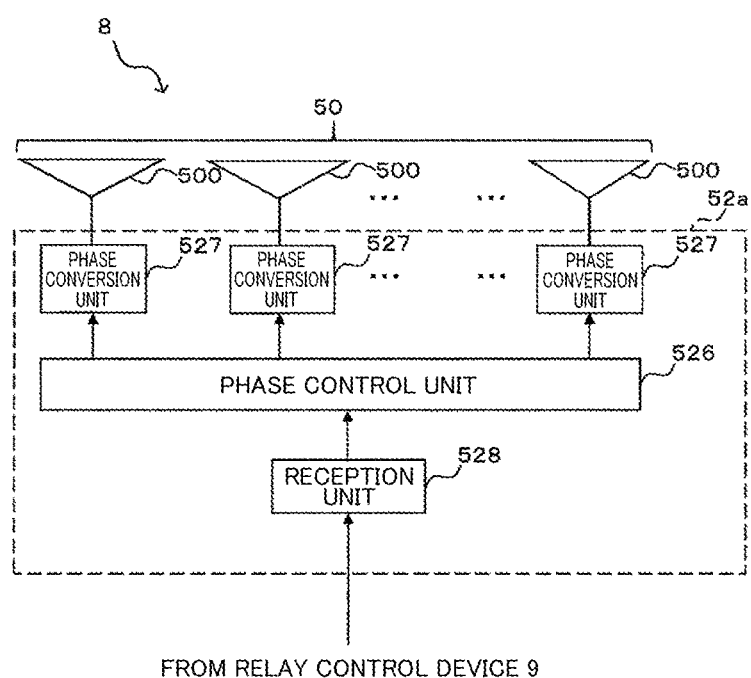
FIG. 5 is a functional block diagram illustrating functions that a relay device has.

FIG. 5 is a functional block diagram illustrating the functions of the relay device 8. As shown in FIG. 5, the relay device 8 includes a radiation unit 50 that forms a beam and a control unit 52a that controls the radiation unit 50, and relays radio waves. For the relay device 8 shown in FIG. 5, the functional blocks substantially the same as the functional blocks of the relay unit 5 shown in FIG. 2 are designated by the same reference numerals.

The control unit 52a includes a reception unit 528, a phase control unit 526, and a plurality of phase conversion units 527. The reception unit 528 receives information transmitted by the relay control device 9 and outputs it to the phase control unit 526.

Figure 6:
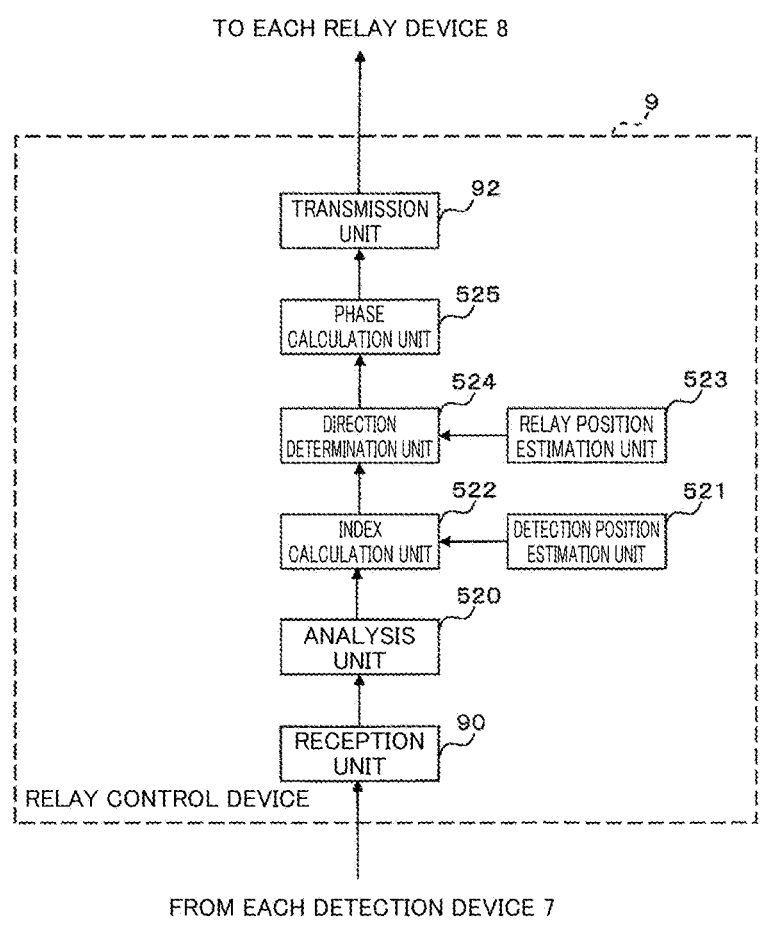
FIG. 6 is a functional block diagram illustrating functions that the relay control device has.

FIG. 6 is a functional block diagram illustrating functions of the relay control device 9. As shown in FIG. 6, the relay control device 9 includes, for example, a reception unit 90, an analysis unit 520, a detection position estimation unit 521, an index calculation unit 522, a relay position estimation unit 523, a direction determination unit 524, a phase calculation unit 525, and a transmission unit 92. For the relay control device 9 shown in FIG. 6, the functional blocks substantially the same as the functional blocks of the relay unit 5 shown in FIG. 2 are designated by the same reference numerals.

The reception unit 90 receives the environmental information transmitted by each detection device 7 and outputs it to the analysis unit 520. The transmission unit 92 transmits the phase (phase amount) of the radio wave calculated by the phase calculation unit 525 to the relay device 8 corresponding to each of the detection devices 7.

That is, the wireless communication system 1a can reflect or re-radiate radio waves in the same manner as the wireless communication system 1 to enable wireless communication between the base station 2 and the wireless terminal 3. The relay device 8 may be arranged near the corresponding detection device 7, or may be associated with the detection device 7 arranged at a distant position.

Further, the relay control device 9 can cover an area where, for example, the relay devices 8-1 and 8-2 are the same (or partially common), and may control the relay device 8 having the shortest distance to the area to relay radio waves in a case where there are multiple areas with relatively high index values, or in a case where the areas with the highest priority of the relay devices 8-1 and 8-2 overlap.

Further, the relay control device 9 may control such that the reflection (re-radiation) direction of the relay device 8 having the shortest distance to the area is assigned to the area, and the other relay device 8 is assigned to the area having the next highest priority. The relay control device 9 may repeat the same process even when the areas having the next highest priority overlap. Further, the relay control device 9 may perform the process stated above in a case where the upper limit of the number of relay devices 8 that allow duplication is set in advance and the number of relay devices 8 exceeds the upper limit.

The functions of the relay control device 9 are not limited to the example shown in FIG. 6. For example, the relay control device 9 may not have all the functions of the analysis unit 520, the detection position estimation unit 521, the index calculation unit 522, the relay position estimation unit 523, the direction determination unit 524, and the phase calculation unit 525. Each function of the relay control device 9 may be divided into a plurality of devices. A method in which the relay control device 9 establishes communication with the detection device 7 and the relay device 8 may be wired communication or wireless communication, respectively.

Each function of the relay control device 9 may be partially or wholly configured by hardware such as PLD (programmable logic Device) or FPGA (field programmable gate array), or may be configured as a program executed by a processor such as a CPU.

For example, the relay control device 9 according to the present English Translation of invention can be implemented using a computer and a program, and the program can be recorded on a recording medium or provided via a network.

Figure 7:
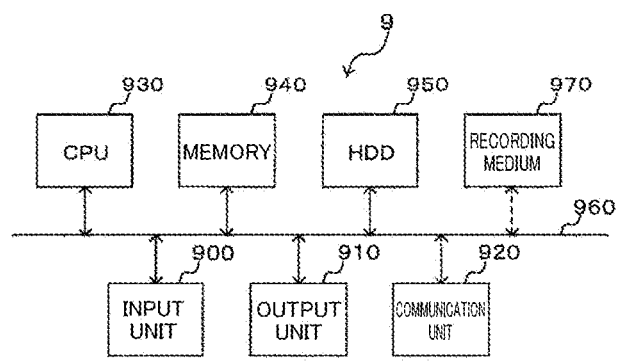
FIG. 7 is a diagram illustrating an exemplified hardware configuration of the relay control device according to one embodiment.

FIG. 7 is a diagram illustrating an exemplified hardware configuration of the relay control device 9 according to one embodiment. As shown in FIG. 7, for example, the relay control device 9 has an input unit 900, an output unit 910, a communication unit 920, a CPU 930, a memory 940, and an HDD 950, connected via a bus 960 with each other, which has a function as a computer. The relay control device 9 is configured to be able to input/output data to/from a computer-readable recording medium 970.

The input unit 900 is, for example, a keyboard or a mouse. The output unit 910 is a display device, for example, a display. The communication unit 920 is a wired or wireless network interface.

As described above, the CPU 930 controls each unit constituting the relay control device 9 and performs, for example, predetermined processes. The memory 940 and the HDD 950 are storage units for storing data and the like.

The recording medium 970 is capable of storing a program for executing the functions of the relay control device 9. The architecture constituting the relay control device 9 is not limited to the example shown in FIG. 7.

It is assumed that a "computer" as used herein includes an OS and hardware such as peripheral devices. In addition, a "computer-readable recording medium" refers to a portable medium such as a flexible disk, a magneto-optical disk, a ROM, or a CD-ROM.

Furthermore, a "computer-readable recording medium" may also include a computer-readable recording medium that dynamically holds a program for a short amount of time, such as a communication line used in the case of transmitting a program via a network such as the Internet or a communication line such as a telephone line, and a computer-readable recording medium in which a program is held for a certain amount of time, such as a volatile memory inside a computer that serves as a server or a client in such a case.

Although embodiments of the present invention were described above with reference to the drawings, it is apparent that the embodiments stated above are merely exemplary illustrations of the present invention and the present invention is not limited to those embodiments. Accordingly, additions, omissions, substitutions, and other modifications of the components may be made within a scope that does not depart from the technical spirit and scope of the present invention.

REFERENCE SIGNS LIST

1, 1a: Wireless communication system
2: Base station
3: Wireless terminal
4, 4a: Relay system
5: Relay unit
6: Detection unit
7-1, 7-2: Detection device
8-1, 8-2: Relay device
9: Relay control device
50: Radiation unit
52: Relay control unit
52a: Control unit
90: Reception unit
92: Transmission unit
500: Element
520: Analysis unit
521: Detection position estimation unit
522: Index calculation unit
523: Relay position estimation unit
524: Direction determination unit
525: Phase calculation unit
526: Phase control unit
527: Phase conversion unit
528: Reception unit
900: Input unit
910: Output unit
920: Communication unit
930: CPU
940: Memory
950: HDD
960: Bus
970: Recording medium

The invention claimed is:

1. A relay system for relaying radio waves between one or more wireless terminals and a base station, the relay system comprising:
   one or more radiation units configured to form a beam in a predetermined direction by radiating radio waves from each of a plurality of elements;
   one or more detection units configured to capture data other than radio waves, where the data is indicative of a physical environment on a radio wave propagation path that affects the beam formed by the radiation unit;
   a direction determination unit configured to determine a direction in which the radiation unit should form the beam based on the physical environment detected by the detection unit;
   a phase calculation unit configured to calculate a phase of radio waves to be radiated by each of the plurality of elements such that the radiation unit forms a beam in the direction determined by the direction determination unit; and
   a phase control unit configured to control the phase of the radio waves radiated by each of the plurality of elements based on the phase calculated by the phase calculation unit.

2. The relay system according to claim 1, further comprising:
   an analysis unit configured to analyze an influence of the physical environment detected by the detection unit on the beam; and
   an index calculation unit configured to calculate an index usable for the direction determination unit to determine the direction using the result analyzed by the analysis unit,
   wherein
   the direction determination unit is configured to:
   determine the direction in which the radiation unit should form the beam based on the index calculated by the index calculation unit.

3. The relay system according to claim 1, wherein the phase calculation unit is configured to:

divide the plurality of the elements into a plurality of element groups, in a case where one of the radiation units radiates using radio waves transmitted from a plurality of wireless terminals, and calculate the phase of the radio waves radiated by each of the elements such that the radio wave is radiated to a different wireless terminal for each element group.

4. A relay control device for controlling one or more relay devices, wherein each of the relay devices includes a radiation unit configured to form a beam in a predetermined direction by radiating radio waves from each of a plurality of elements in accordance with a preset phase, while relaying radio waves between one or more wireless terminals and a base station, the relay control device comprising:
   a direction determination unit configured to determine a direction in which the radiation unit should form the beam based on a physical environment detected by one or more detection devices, wherein each of the detection devices is configured to capture data other than radio waves, where the data is indicative of the physical environment on a radio wave propagation path that affects the beam formed by the radiation unit;
   a phase calculation unit configured to calculate a phase of radio waves to be radiated by each of the plurality of elements such that the radiation unit forms a beam in the direction determined by the direction determination unit; and
   a transmission unit configured to transmit information indicating the phase calculated by the phase calculation unit to the relay device.

5. The relay control device according to claim 4, further comprising:
   an analysis unit configured to analyze an influence of the physical environment detected by the detection device on the beam; and
   an index calculation unit configured to calculate an index usable for the direction determination unit to determine the direction using the result analyzed by the analysis unit,
   wherein
   the direction determination unit is configured to:
   determine the direction in which the radiation unit should form the beam based on the index calculated by the index calculation unit.

6. The relay control device according to claim 4, wherein the phase calculation unit is configured to:
   divide the plurality of the elements into a plurality of element groups, in a case where one of the radiation units radiates using radio waves transmitted from a plurality of wireless terminals, and calculate the phase of the radio waves radiated by each of the elements such that the radio wave is radiated to a different wireless terminal for each element group.

7. A relay method for relaying radio waves between one or more wireless terminals and a base station, the method comprising:
   capturing data other than radio waves, where the data is indicative of a physical environment on a radio wave propagation path that affects a beam formed by one or more radiation units that form a beam in a predetermined direction by radiating radio waves from each of the plurality of elements;
   determining a direction in which the radiation unit should form the beam based on the physical environment detected;
   calculating a phase of radio waves to be radiated by each of the plurality of elements such that the radiation unit forms a beam in the direction determined; and
   controlling the phase of the radio waves radiated by each of the plurality of elements based on the calculated phase.

8. A non-transitory computer-readable storage medium storing a relay control program for enabling a computer to function as the units included in the relay control device according to claim 4.

9. The relay system according to claim 1 wherein each of the one or more detection units is a device separate and distinct from the one or more wireless terminals and the base station.

10. The relay system according to claim 1 wherein each of the one or more detection units is configured to capture image data of the physical environment on the radio wave propagation path.

* * * * *